(12) United States Patent
Daubigny

(10) Patent No.: US 9,913,041 B2
(45) Date of Patent: Mar. 6, 2018

(54) VOICE COIL MOTOR AND LOUDSPEAKER CONTROLLER

(71) Applicant: NXP B.V., Eindhoven (NL)

(72) Inventor: Lise Daubigny, Ottignies (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/821,607

(22) Filed: Aug. 7, 2015

(65) Prior Publication Data
US 2016/0050497 A1 Feb. 18, 2016

(30) Foreign Application Priority Data
Aug. 18, 2014 (EP) .................................. 14181324

(51) Int. Cl.
*H04R 29/00* (2006.01)
*H04R 9/06* (2006.01)
*H04R 3/02* (2006.01)
*H02P 25/034* (2016.01)

(52) U.S. Cl.
CPC ............. *H04R 9/06* (2013.01); *H02P 25/034* (2016.02); *H04R 3/02* (2013.01)

(58) Field of Classification Search
CPC ......... H04L 25/0276; H04R 3/02; H04R 9/06; H04B 15/06; H04B 1/22; H04B 1/64; H04M 3/40; H04N 9/28; H04N 9/285; H04N 3/16; H04N 3/237; H04N 3/185; H04N 3/223; H04N 3/233; H04N 5/126; H04N 9/29
USPC ..... 381/120, 121, 55–59, 96, 150, 396, 398, 381/423, 400, 403, 401, 111, 117; 330/250, 252, 254
See application file for complete search history.

(56) References Cited

U.S. PATENT DOCUMENTS

| | | | |
|---|---|---|---|
| 8,817,995 B2 | 8/2014 | Huijser et al. | |
| 9,014,380 B2 | 4/2015 | Gautama et al. | |
| 9,538,268 B2* | 1/2017 | Gladwin | H04R 1/00 |
| 2005/0031139 A1* | 2/2005 | Browning | H04R 3/002 381/96 |
| 2008/0265825 A1 | 10/2008 | Su | |
| 2012/0207314 A1* | 8/2012 | Gautama | H04R 3/002 381/55 |
| 2012/0328113 A1 | 12/2012 | Gautama | |
| 2013/0077795 A1 | 3/2013 | Risbo et al. | |

(Continued)

FOREIGN PATENT DOCUMENTS

| | | |
|---|---|---|
| CN | 102348147 A | 2/2012 |
| CN | 102843633 A | 12/2012 |
| EP | 2 642 769 A1 | 9/2013 |

OTHER PUBLICATIONS

Kippel, Wolfgang; "Loudspeaker Nonlinearities—Causes, Parameters, Symptoms"; J. Audio Eng. Soc., 54 (10); pp. 907-939 (Oct. 2006).

(Continued)

*Primary Examiner* — Lao Lun-See

(57) ABSTRACT

A voice coil motor controller configured to determine a voltage across and a current through a voice coil motor having an input signal supplied thereto and determine its impedance therefrom, the controller further configured to identify asymmetry in variations of said impedance over time to determine an asymmetry value, the controller further configured to provide for control of said voice coil motor using said asymmetry value.

14 Claims, 2 Drawing Sheets

(56) References Cited

U.S. PATENT DOCUMENTS

| | | | |
|---|---|---|---|
| 2013/0251164 A1* | 9/2013 | Gautama | H04R 29/001 381/59 |
| 2014/0294206 A1* | 10/2014 | Shen | H03K 7/00 381/120 |
| 2015/0124982 A1* | 5/2015 | Berthelsen | H04R 29/001 381/59 |
| 2015/0181318 A1 | 6/2015 | Gautama et al. | |

OTHER PUBLICATIONS

Behler, Dr Ing Gottfried; "Measuring the Loudspeaker's Impedance During Operation for the Evaluation of the Voice Coil Temperature"; AES, New York, NY, US; Paris, FR; 14 pages (Feb. 2005).
Extended European Search Report for application 14181324.6 (dated Dec. 4, 2014).

* cited by examiner

VOICE COIL MOTOR AND LOUDSPEAKER CONTROLLER

CROSS-REFERENCE TO RELATED APPLICATIONS

This application claims the priority under 35 U.S.C. § 119 of European patent application no. 14181324.6, filed Aug. 18, 2014 the contents of which are incorporated by reference herein.

This invention relates to a voice coil motor controller and to a loudspeaker controller. It also relates to a method of controlling a voice coil motor or loudspeaker.

A loudspeaker is a device having a voice coil motor that moves a diaphragm and converts an electrical signal into an acoustic one. For small electrical signals, for which the diaphragm displacement is small, an accurate linear transfer function can be defined between an input voltage signal and the diaphragm displacement function. However, for input signals that result in a larger diaphragm displacement the linear model is invalid, due to the nonlinear behaviour of the loudspeaker and predictions of the displacement of the diaphragm based upon a linear transfer function are inaccurate. Mechanically protecting a loudspeaker such that its diaphragm displacement is not overly conservative while remaining within the bounds prescribed by the manufacturer under large-amplitude signal conditions is therefore a challenging problem. While a voice coil motor can be used to drive a loudspeaker, such motors may have other uses, such as in cameras to move lens elements, or in sensors. The precise and accurate control of the displacement of a voice coil motor is therefore relevant not only to loudspeakers but in other fields of electronic devices.

According to a first aspect of the invention, we provide a voice coil motor controller configured to determine a voltage across and a current through a voice coil motor having an input signal supplied thereto and determine its impedance therefrom, the controller further configured to identify asymmetry in variations of said impedance over a predetermined time to determine an asymmetry value, the controller further configured to provide for control of said voice coil motor using said asymmetry value.

This is advantageous as it has been found that determining changes in the impedance of the voice coil motor over time and, in particular, its inductance, can provide an indication of the asymmetry in the displacement of the voice coil motor. Further, the impedance has been found to relate to displacement of the voice coil motor and by statistically monitoring the impedance the asymmetry or DC offset of the voice coil motor or system of which it forms part can be determined. Thus, for a voice coil motor that drives a loudspeaker, the controller can determine asymmetry in the operation of the loudspeaker and may provide feedback for control of the loudspeaker. The short-term instantaneous variation of the inductance relates to the displacement of the voice coil motor and therefore asymmetry can be determined by monitoring the variations in inductance over a calculation window.

The controller may be configured to account for any asymmetry in the input signal when determining the asymmetry value of the impedance. Thus, the controller may determine whether any detected asymmetry on the displacement of the voice coil motor is caused by the input signal itself. The controller may modify the displacement asymmetry value accordingly.

The control of this voice coil motor may comprise providing a DC bias signal for reducing the asymmetry in variations of said impedance. Thus, the controller may provide feedback for the voice coil motor for modification of the input signal applied to the voice coil motor. In particular, a DC bias may be applied to the input signal to compensate (wholly or partially) for the detected asymmetry in the voice coil motor displacement.

The control of this voice coil motor may comprise providing an asymmetrical clipping function for application to the input signal for reducing the asymmetry in variations of said impedance. Thus, the form of the input signal may be modified by applying a gain, via the clipping function, and applying limits of different values to positive and negative peaks of the input signal. Thus, the positive values may be clipped by a different amount to the negative peaks. This may compensate wholly or partially for the detected asymmetry.

The controller may be configured to determine the asymmetry value using a measure of an average upper value of the variations of impedance and an average lower value of the variations of impedance. A ratio of the upper and lower peaks (values above or below a predetermined threshold) of the variations of impedance may be determined to derive the asymmetry value. The ratio may be of route-mean-squared variations of impedance values. The controller may be configured to provide for control of the voice coil motor if the asymmetry value exceeds a threshold.

The controller may be configured to determine the asymmetry value using a measure of skewness in the variation of impedance value over time. The skewness of a set of variation of impedance values may be determined. The set may be defined by a sliding window, which may be defined in terms of time or a particular number of variation of impedance values.

The voice coil motor controller may be configured to introduce a measurement signal of a predetermined frequency into the input signal and measure the voltage and current at said predetermined frequency. The measurement signal may have a frequency outside of audible range. The measurement signal may have a frequency greater than 20 kHz. Thus, the input signal may comprise an audio input signal and the measurement signal may comprise an added inaudible signal. Alternatively, the input signal may comprise the measurement signal.

The voltage across the voice coil motor may be calculated from an input signal applied to an amplifier used to drive said voice coil motor using predetermined parameters characterising said amplifier. The current through and/or voltage across the voice coil motor may be measured by sensors.

According to a second aspect of the invention we provide a loudspeaker controller comprising the voice coil motor controller of the first aspect, the voice coil motor configured to drive a diaphragm of a loudspeaker.

Thus, the invention has particular application in determining the asymmetry in the displacement of loudspeakers.

The loudspeaker controller may include an acoustic signal processor for processing the input signal, comprising an audio signal, to be applied to the voice coil motor, the acoustic signal processor configured to modify the processing of the input signal based on said control signal.

The control signal may be configured to provide for an increase in the amplitude of the input signal based on the asymmetry value. The available range for displacement between excursion limits may be greater once the asymmetry or offset is compensated for. Thus, the input signal may be amplified accordingly.

According to a third aspect of the invention we provide a method of controlling a voice coil motor comprising;

determining a voltage across and a current through the voice coil motor;

determining, from said voltage and current, an impedance of the voice coil motor;

identifying asymmetry in variations of said impedance value over a predetermined time to determine an asymmetry value, providing a control signal to said voice coil motor using said asymmetry value.

According to a further aspect of the invention we provide a loudspeaker amplifier including the controller of the second aspect.

BRIEF DESCRIPTION OF THE DRAWINGS

There now follows, by way of example only, a detailed description of the invention with reference to the accompanying drawings, in which.

DETAILED DESCRIPTION

The examples discussed below relate to a voice coil motor controller for a loudspeaker. The voice coil motor controller or "loudspeaker controller" is configured to control the voice coil that drives a diaphragm of a loudspeaker. It will, however, be appreciated that the voice coil motor controller may have wider application for controlling voice coil motors outside of acoustic applications, such as in sensors or cameras.

Loudspeaker protection schemes are provided to improve the operational lifetime of the loudspeaker. The maximum diaphragm displacement of a loudspeaker should be kept within safe limits. Loudspeakers behave differently at small and high displacements. This indicates that nonlinearities exist in the system. Some types of nonlinearities, such as nonlinearities of the voice coil motor or nonlinearities of the membrane stiffness of a diaphragm, can lead to an asymmetry in the diaphragm displacement or even a DC-offset. This may cause the inward-moving diaphragm displacement to be larger or smaller than the outward-moving for the same excitation.

Figure 1A:
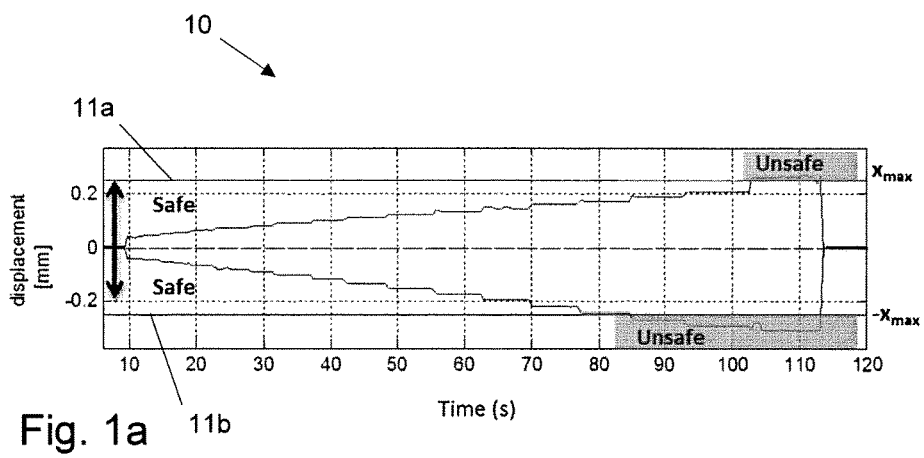
FIG. 1a shows a graph of voice coil motor displacement over time with an input signal having a steadily increasing amplitude for a loudspeaker with an asymmetry in its non-linear behaviour.

FIG. 1a shows a graph 10 of the displacement of a loudspeaker from a neutral position over time where an input signal to the loudspeaker increases in amplitude. This particular loudspeaker has acceptable excursion limits 11a, 11b of +0.22 mm and −0.22 mm. It can be seen that the positive and negative excursion limits 11a, 11b are reached at different times. In particular, the negative excursion limit is reached after 82 seconds and the positive excursion limit is reached after 102 seconds. Thus, the displacement characteristic of this loudspeaker is asymmetrical. This may be caused by a DC-displacement of the membrane of the loudspeaker. It will be appreciated that this asymmetry in exceeding the positive and negative excursion limits hinders loudspeaker performance. Thus, the maximum loudness of the loudspeaker without exceeding operating parameters is limited by the asymmetry rather than the range of the positive and negative excursion limits.

Figure 1B:
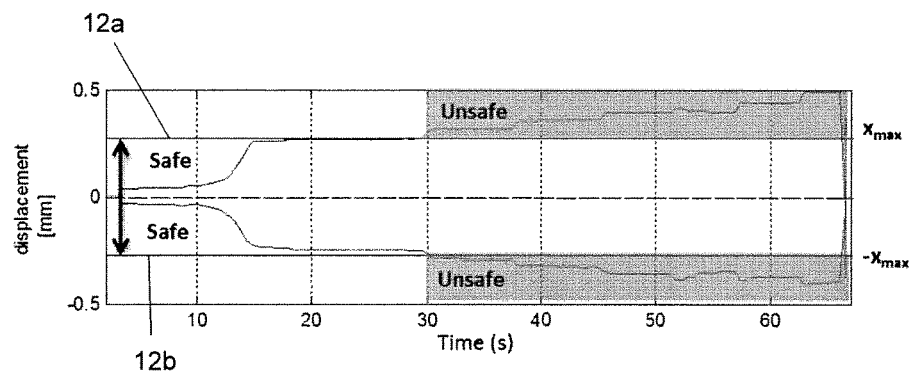
FIG. 1b shows a similar graph for a loudspeaker with a symmetrical response.

FIG. 1b shows a similar graph having excursion limits 12a and 12b. The steadily increasing input signal amplitude causes the loudspeaker to reach its positive and negative excursion limits at the same time. Accordingly, this loudspeaker has low or substantially zero asymmetry in its displacement characteristics.

Providing loudspeaker protection to limit the maximum displacement of a loudspeaker may be problematic when the loudspeaker has asymmetrical displacement characteristics. Therefore, it is advantageous to provide a method and controller for detecting asymmetry, which may also provide improved loudspeaker protection schemes.

Figure 2:
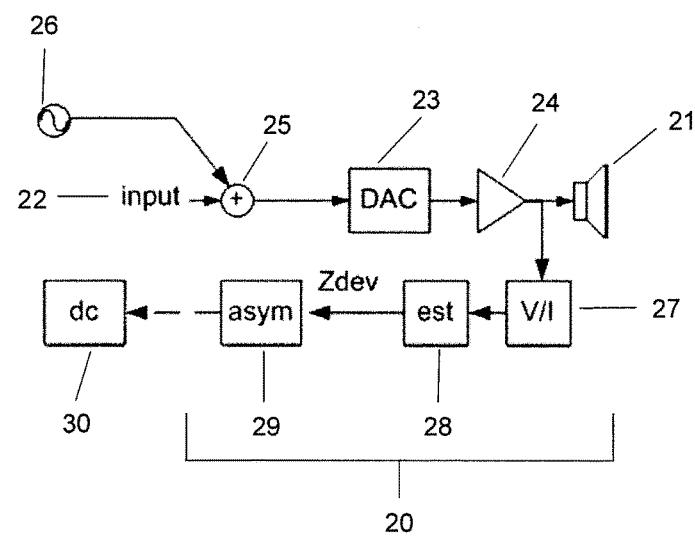
FIG. 2 shows a first example of a voice coil motor controller.

FIG. 2 shows a first example of a loudspeaker controller 20. In this example, the controller 20 is provided to determine a DC offset of a loudspeaker 21. The operation of the loudspeaker 21 can then be controlled. The loudspeaker includes a voice coil motor to drive a diaphragm of the loudspeaker. The loudspeaker 21 is driven by an input signal 22, which is converted to an analogue signal by digital to analogue convertor (DAC) 23 and then amplified by an amplifier 24 before being applied to the loudspeaker 21. A mixer element 25 arranged prior to the DAC 23 and amplifier 24 is provided for introducing a measurement signal, generated by a measurement signal generator 26, into the input signal. The controller 20 includes a sensor 27 configured to measure a voltage across and a current flowing through the voice coil of the loudspeaker 21. An impedance calculation element 28 is configured to receive the measured voltage and current and, using the measurement signal, determine time-varying impedance information of the loudspeaker. A displacement of a diaphragm of the loudspeaker 21 or a measure related to it can be derived from the time-varying impedance information. The controller 20 can therefore use said time-varying impedance information to determine asymmetry in the displacement of the loudspeaker 21. An asymmetry determination module 29 is configured to determine a measure of the asymmetry in the displacement of the loudspeaker 21 using a plurality of measurements of impedance over time. The asymmetry determination module 29 provides an asymmetry value which, in this example, comprises an estimate of the DC offset 30. The controller 20 may control loudspeaker or its voice coil motor using the asymmetry value. For example, as a non-exhaustive list, the controller may modify the input signal 22 as a function of the asymmetry value, apply a compensating DC offset to compensate for the determined DC offset 30, or provide design changes to the loudspeaker.

The measurement signal generator 26, in this embodiment, is configured to generate a measurement signal comprising a pilot tone. The pilot tone comprises a sine wave having a frequency ω0 outside the audio band, such as 22 kHz. It will be appreciated that other frequencies, inside or outside the audible band may be used. Thus, the input signal and pilot tone are amplified and provided to the loudspeaker 21. The amplitude of the pilot tone is low and, as an example, may comprise substantially 1% of the input signal. It will be appreciated that the amplitude of the pilot tone can be altered depending on the dynamic range of the current/voltage sensor 27. It will be appreciated that the input signal may not always be of a frequency or amplitude to cause asymmetry in the displacement of the loudspeaker.

The impedance calculation element 28 receives a plurality of instantaneous measurements of the voltage and current from the sensor 27. The sensor 27 may sample the voltage and current at a frequency greater than the frequency of the measurement signal. Thus, the plurality of measurements describe the changes in voltage and current in the loudspeaker 21. The sensor 27 may be configured to measure the voltage and current over a wide range of frequencies or, alternatively, it may be configured to measure the voltage and current at the frequency of the measurement signal/pilot tone.

The controller 20 does not need to know any physical parameters of the loudspeaker 21, such as the mechanical mass of the loudspeaker nor the make or model. Further, laser based measurement equipment is not required to determine any asymmetry. The asymmetry in the displacement of the cone/voice coil motor may be derived from the time-varying impedance of an operating loudspeaker. The analysis of measurements of the impedance of an operating loudspeaker as an indication of asymmetry in its diaphragm displacement provides a convenient and non-computationally intensive way of providing loudspeaker protection, providing efficient loudspeaker operation and/or input signal processing.

The impedance information has been found to contain information about the excursion of the loudspeaker and can therefore be used to identify asymmetry in the excursion of the loudspeaker/voice coil motor. In particular, the inductance of the voice coil can yield information about the excursion asymmetry of the loudspeaker and information of the voice coil inductance of the loudspeaker is contained within its electrical impedance function. The impedance function is estimated as the ratio of the voltage across the voice coil to the current through it. Mathematically, this can be expressed as;

$$Z(\omega) = \frac{V(\omega)}{I(\omega)} \quad (1)$$

where $V(\omega)$, $I(\omega)$ and $Z(\omega)$ are the voltage, current and electrical impedance of the loudspeaker voice coil at frequency $\omega$.

The electrical impedance can be determined by the impedance calculation element 28 by a number of different methods. In this embodiment, the element 28 receives from the sensor 27 the voltage and current signals, from which the voltage at measurement signal frequency $\omega 0$, $V(\omega 0)$, and the current at frequency $\omega 0$, $I(\omega 0)$, can be computed using a frequency-domain estimation technique. The element 28 has knowledge of the waveform of the measurement signal and its frequency. In this embodiment a short-time Fourier transform is used, although it will be appreciated that any algorithm which can estimate the impedance at a specific frequency point is suitable. Alternatively, the controller may be configured to use the Goertzel algorithm or a filter bank to determine the time-varying impedance information. It will be appreciated that any algorithm which can estimate the impedance at a specific frequency point is suitable.

The element 28 can then calculate the ratio $Z(\omega 0)$ from these quantities according to Equation (1) above.

The impedance information obtained, which is indicative of the displacement of the loudspeaker 21 can then be analysed by the asymmetry determination element 29.

In this example, the asymmetry determination element 29 is configured to statistically analyse the impedance measurements to determine any asymmetry in the displacement. In particular, the element 29 is configured to determine the skewness $\gamma_1$ of the impedance variable, designated X, in accordance with the following equation;

$$Y_1 = E\left[\left(\frac{X-\mu}{\sigma}\right)^3\right]$$

Where $\mu$ is the mean and $\sigma$ is the standard deviation of a set of instantaneous variation of impedance values, and E is the expectation operator. A normal distribution has a skewness of zero. The instantaneous variation of impedance values forming the set may be selected by a sliding window or any other means. Thus, the instantaneous variation of impedance values may be determined over a predetermined time period.

In another example, the asymmetry determination element 29 is configured to determine a ratio of upper and lower peak in the variation of impedance values over a predetermined time period. An asymmetry may be detected if the ratio exceeds a predetermined threshold. In another example, the asymmetry determination element 29 is configured to determine a ratio between the root-mean-square of the upper and lower variation of impedance values. In another example, an average inductance is determined, such as by using a low pass filter, and a difference between the current inductance and the average inductance is monitored to determine any asymmetry.

Figure 3:
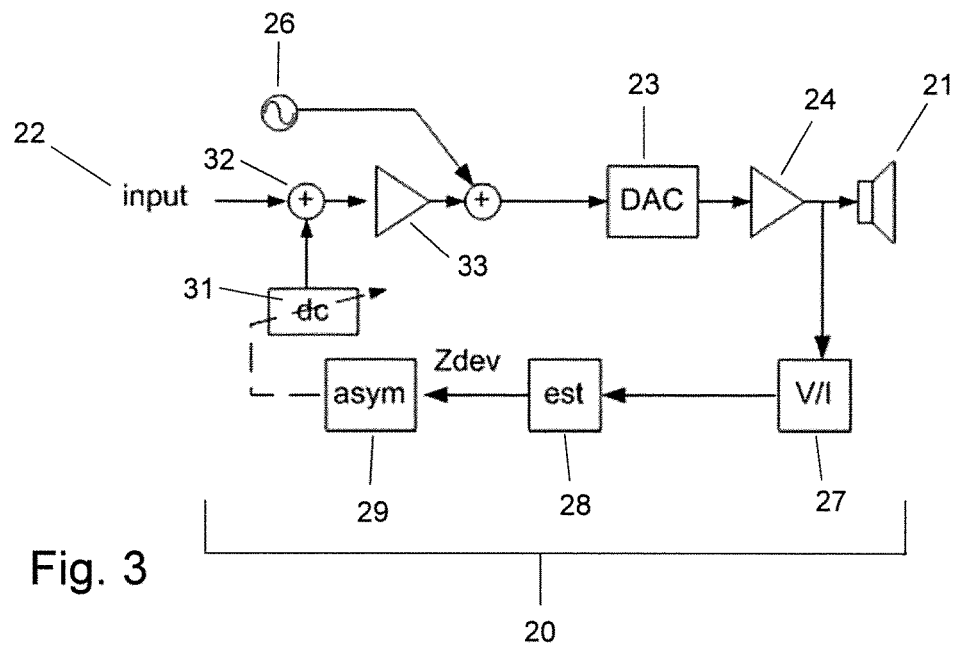
FIG. 3 shows a second example of a voice coil motor controller.

FIG. 3 shows a second embodiment. The same reference numerals have been used for the same parts. In this embodiment, the asymmetry determination element 29 provides a control signal for modification of an input supplied to the loudspeaker. In particular, the control signal is applied to a DC bias element 31. The DC bias element 31 is configured to apply a DC offset or bias to the input signal 22 to compensate for the detected asymmetry in the displacement of the loudspeaker. Thus, the magnitude of the detected asymmetry controls the magnitude of the compensatory DC offset applied by the DC bias element 31. A further mixer 32 is provided to combine the input signal 22 to the loudspeaker 21 with the bias signal from the DC bias element 31. A further amplifier 33 is provided to amplify the biased input signal prior to combination with the measurement signal. Prior to determination of the asymmetry, the amplitude of the input signal may have been limited by the asymmetric reaching of excursion limits as demonstrated in FIG. 1a. The further amplifier 33 may be controlled by the asymmetry determination element 29 to amplify the input signal to account for the wider available excursion range provided by the biasing of the input signal 22 such that the loudspeaker displacement is centred between the excursion limits.

Figure 4:
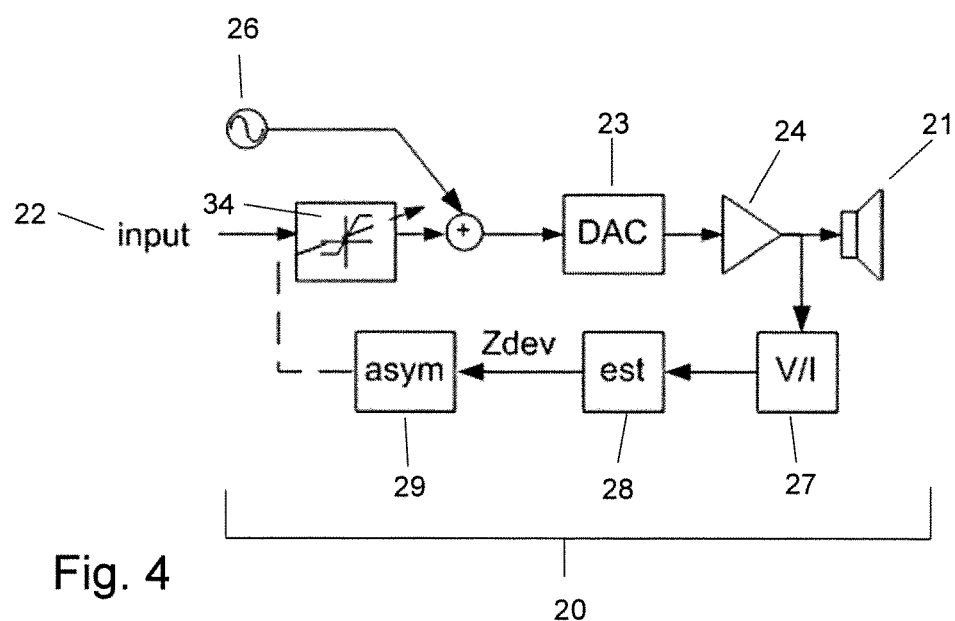
FIG. 4 shows a third example of a voice coil motor controller.

FIG. 4 shows a further embodiment in which the asymmetry determination element 29 provides a control signal. In particular, the control signal is used to determine a clipping function to be applied to the input signal 22. A signal processor 34 is provided to receive the input signal 22 prior to mixing with the measurement signal 26. The signal processor 34 receives the control signal from the asymmetry determination element 29 and determines an asymmetrical clipping function, i.e. a function that applies a gain and limits the positive and negative peaks of the input signal to different values. The signal processor 34 receives the input signal and applies the clipping function thereto. The asymmetrical signal processing of the input signal may be used to compensate for asymmetry in the displacement of the loudspeaker 21, its voice coil motor or other part of the system.

Thus, the embodiments of FIGS. 3 and 4 provide a closed loop control system in which detection of displacement asymmetries in the operation of the loudspeaker 21 are compensated for by generation of a control signal from the asymmetry determination element.

In each of the embodiments above the asymmetry determination element 29 may receive the input signal 22. Thus, any asymmetry in the input signal that may lead to the element 29 erroneously determining an asymmetry in the operation of the loudspeaker can be determined. The element 29 may be configured to take account of the asymmetry in the input signal when calculating the control signal or the asymmetry value. In other embodiments, the element 29 may wait until a less asymmetric input signal is received before determining any asymmetry in the loudspeaker 21.

It will be appreciated that while the above embodiments relate to the determination of displacement asymmetries in loudspeakers, the invention can be applied to any voice coil motor.

In other embodiments, the measurement signal comprises noise introduced into the input signal over a particular frequency band. Then, identification techniques such as a short-time estimation cross-correlation function, can be utilised to determine the characteristics of $Z(\omega 0)$ in the particular frequency region where the narrowband noise has been centred. Further, multiple pilot tones may be introduced. For example, three pilot tones may be introduced into the input signal at three different frequencies $\omega 1$, $\omega 2$ and $\omega 3$ and the impedance $Z(\omega 1)$, $Z(\omega 2)$ and $Z(\omega 3)$ at those frequencies determined. The multiple pilot tones may or may not be in the audible range.

The invention claimed is:

1. A voice coil motor controller configured to determine a voltage across and a current through a voice coil motor configured to drive a diaphragm of a loudspeaker in response to an input signal supplied thereto, determine an impedance of the voice coil motor from the voltage and the current, identify asymmetry in the impedance in response to the input signal, generate an excursion asymmetry value of the diaphragm of the loudspeaker based on the impedance asymmetry, and control the voice coil motor using the excursion asymmetry value.

2. The voice coil motor controller according to claim 1, in which the voice coil motor controller is configured to account for any asymmetry in the input signal when determining the excursion asymmetry value of the impedance.

3. The voice coil motor controller as defined in claim 1, in which said control comprises providing a DC bias signal for reducing the asymmetry in said impedance.

4. The voice coil motor controller as defined in claim 1, in which said control comprises providing an asymmetrical clipping function for application to the input signal for reducing the asymmetry in variation of said impedance.

5. The voice coil motor controller according to claim 1, in which the voice coil motor controller is configured to determine the excursion asymmetry value using a measure of an average upper value of variation of an impedance value and a measure of an average lower value of the variation of the impedance value.

6. The voice coil motor controller according to claim 1, in which the voice coil motor controller is configured to determine the excursion asymmetry value using a measure of skewness in an impedance value over time.

7. The voice coil motor controller as defined in claim 1, wherein the voice coil motor controller is configured to introduce a measurement signal of a predetermined frequency into the input signal and measure the voltage and the current at said predetermined frequency.

8. The voice coil motor controller according to claim 7, in which said measurement signal has a frequency outside of audible range.

9. The voice coil motor controller as defined in claim 8, in which the measurement signal has a frequency greater than 20 kHz.

10. The voice coil motor controller according to claim 1, in which the voltage across the voice coil motor is calculated from an input signal applied to an amplifier used to drive said voice coil motor using predetermined parameters characterizing said amplifier.

11. The voice coil motor controller according to claim 1, wherein the voice coil motor controller includes an acoustic signal processor configured to process an audio input signal, to be applied to the voice coil motor and modify the processing of the audio input signal based on said control signal.

12. The voice coil motor controller according to claim 1, wherein the control signal is configured to provide for an increase in the amplitude of the input signal based on the asymmetry value.

13. A method of controlling a voice coil motor configured to drive a diaphragm of a loudspeaker, the method comprising;
determining a voltage across and a current through the voice coil motor;
determining, from said voltage and current, an impedance of the voice coil motor;
identifying impedance asymmetry in said impedance over time;
generating an excursion asymmetry value of the diaphragm of the loudspeaker based on the impedance asymmetry; and
providing a control signal to said voice coil motor using said excursion asymmetry value.

14. A loudspeaker amplifier including the voice coil motor controller of claim 1.

* * * * *